United States Patent Office 3,784,620
Patented Jan. 8, 1974

3,784,620
PROCESS FOR THE SEPARATION OF STYRENE FROM ETHYLBENZENE
Eli Perry, St. Louis, Mo., and William F. Strazik, Wilbraham, Mass., assignors to Monsanto Company, St. Louis, Mo.
No Drawing. Filed Dec. 14, 1972, Ser. No. 315,254
Int. Cl. C07c 7/02
U.S. Cl. 260—669 A          10 Claims

ABSTRACT OF THE DISCLOSURE

Styrene is separated from organic mixtures comprising styrene and ethylbenzene by contacting the said mixture under pervaporation permeation conditions against one side of a polyamide permeation membrane and withdrawing on the other side of the membrane a vaporous mixture having an increased concentration of styrene. The polyamides have units selected from the group consisting of

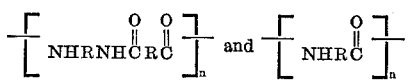

wherein R and R' are aromatic or aliphatic. Exemplary of the polyamides are nylon-6 and nylon 6, 10.

BACKGROUND OF THE INVENTION

Field of the invention

This invention relates to a process for the separation of styrene from organic mixtures containing same. In a particular aspect this invention relates to a process for the separation of styrene from organic mixtures comprising styrene and ethylbenzene by preferential permeation of the alkene under pervaporation permeation conditions through a polyamide permeation membrane to obtain a more concentrated solution by removing at least a portion of the preferentially permeable styrene component from the original feed in solution. In a more particular aspect, this invention relates to a process for the separation of styrene from organic mixtures comprising styrene and ethylbenzene by contacting said mixture (feed mixture) against one side of a polyamide permeation membrane, the polyamide having units selected from a group consisting of

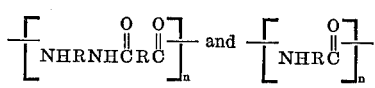

wherein R and R' are aromatic or aliphatic groupings and withdrawing at the second side of the membrane a vaporous mixture having a higher concentration of the alkene.

Description of the prior art

Separation of styrene from organic mixtures comprising styrene and ethylbenzene has been accomplished by distillation procedures. Separation of azeotropic mixtures of organic materials such as mixtures of styrene and 2-chloroethanol and mixtures of ethylbenzene and 2-chloroethanol by pervaporation through certain polymer membranes followed by distillation is also known to the art from U.S. Pat. 2,953,502, issued Sept. 20, 1960 to R. C. Binning and Robert J. Lee. Polymeric materials employed in the form of permeation membranes which have been indicated as being useful in the above-referred to combination membrane distillation separation procedure include nylon and polyacrylonitrile.

SUMMARY OF THE INVENTION

It has been discovered in accordance with the present invention that styrene is effectively separated from organic mixtures comprising styrene and ethylbenzene by contacting the mixture against one side of a polyamide permeation membrane, the polyamide having units selected from the group consisting of

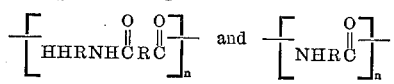

wherein R and R' are defined as above and withdrawing at the second side of the membrane a vaporous mixture having a higher concentration of styrene than the aforesaid feed mixture.

DETAILED DESCRIPTION

The process of the present invention comprises contacting an organic feed mixture comprising styrene and ethylbenzene against one side of a polymeric permeation membrane and withdrawing at the second side a mixture having a higher concentration of the preferentially permeable alkene than in the aforesaid feed mixture. It is essential that the mixture at the second side be maintained at a lower chemical potential than the mixture on the feed side. It is also essential that the product be withdrawn at the second side in the vapor state. In the commercial utilization of the process multistage operation is feasible since this permits the operation of the individual stages at various concentrations and temperatures in order to achieve the optimum driving force for the process.

For each individual stage the effectiveness of the separation is shown by the separation factor (S.F.). The separation factor (S.F.) is defined as the ratio of the concentrations of two substances, A and B, to be separated, divided into the ratio of the concentrations of the corresponding substances in the permeate $$\text{S.F.} = \frac{(C_A/C_B) \text{ in permeate}}{(C_A/C_B) \text{ in permeant}}$$

where $C_A$ and $C_B$ are the concentration of the preferentially permeable component and any other component of the mixture or the sum of other components respectively.

In carrying out the process of the present invention, the first or feed side of the membrane is such that the activities of the components are greater than the activities on the second side of the membrane. Still more preferably, the second side is maintained such that the pressure differential is greater than 0.01 atmosphere. A further mode of operation is with the second side maintained at a vacuum of greater than 0.2 mm. Hg.

The term "chemical potential" is employed herein as described by Olaf A. Hougen and K. M. Watson ("Chemical Process Principles, Part II," John Wiley, New York, 1947). It is related to the escaping tendency of a substance from any particular phase. For an ideal vapor or gas, this escaping tendency is equal to the partial pressure so that it varies greatly with changes in the total pressure. For a liquid, change in escaping tendency as a function of total pressure is small. The escaping tendency always depends upon the temperature and concentration. In the present invention, the feed substance is typically a liquid solution and the other side of the membrane is maintained such that a vapor phase exists. A vapor feed may be employed when the mixture to be separated is available in that form from an industrial process or when heat economies are to be effected in multi-stage process.

The feed side may be at pressures less than atmospheric, but preferably greater than atmospheric, and also at pressures over and above the vapor pressure of the liquid components. The collection or permeate vapor side of the membrane is preferably less than atmospheric pressure, but under proper feed side conditions, also may be greater than atmospheric pressure. The total pressure on the feed side is preferably between 0 p.s.i. absolute and 5,000 p.s.i.g. The conditions are always such as to maintain a higher chemical potential on the feed side than on the collection or vapor side.

The temperatures on the feed side and the collection side may vary over a wide range. However, temperatures should be avoided which cause substantial decomposition of any of the organic materials in the mixture or of the membrane, and which cause the vapor pressure on the collection side of any of the permeated materials to be exceeded by the pressure being maintained on that side. Typically, an increase in temperature causes an increase in permeation rate.

In accordance with the present invention, separations are carried out by removal of the preferentially permeable styrene through the membrane with the said alkene in a higher concentration than in the feed being recovered from the collection side of the membrane as a vapor with the imposition of a state of lower chemical potential on such collection side of the membrane. For example, a mixture of styrene and ethylbenzene may be applied to one side of a flat diaphragm or membrane to accomplish removal of at least a part of the styrene leaving a more highly concentrated ethylbenzene solution on the feed side of the membrane. A state of lower chemical potential is maintained on the collection or downstream side of the membrane by vacuum e.g. from 0.1 mm. Hg to the vapor pressure of the organic component of the mixture which has the lowest vapor pressure at the membrane at the respective temperature as long as the vapor phase is present on the downstream side. In the system referred to above, the styrene selectively passes through the membrane with the styrene-rich composition being removed rapidly as vapor from the collection side of the membrane.

In contrast to the present invention the employment of permeates in liquid phase on the second side of the membrane is impractical because the applied pressure has been found to be prohibitively high e.g. up to 1,000 atmospheres being necessary because of osmotic pressures. Liquid-liquid permeation is largely an equilibrium phenomenon unless the osmotic forces are overcome while in contrast liquid-vapor or vapor-vapor permeations are rate controlled processes even at moderate conditions in which the vapor is removed as soon as it reaches the collection surface of the membrane. Liquid-vapor and vapor-vapor separations are accordingly much more effectively carried out than the liquid-liquid separations.

Permeation membranes useful in the process of the present invention are polyamides having units selected from a group consisting of

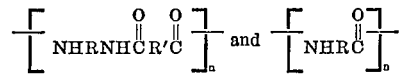

wherein R and R' are selected from a group consisting of aromatic and aliphatic (saturated, unsaturated, branchchain, straight-chain, substituted and unsubstituted). Such polyamides are well known to the art for example from D. E. Floyd, "Polyamide Resins," Reinhold Publishing Corporation, New York (1958). Examples of suitable polyamides useful as membranes in the process of the present invention include nylon-6; nylon 6,10; nylon 6,6; nylon 6,9; nylon 11; nylon 12; copolymers of hexamethylene terephthalamide and hexamethylene adipamide; and the polyamide condensation product of 1,4-bis(aminomethyl)cyclohexane-dodecanoic acid.

The membrane may be a simple disk or sheet of a membrane substance which is suitably mounted in a duct or pipe or mounted in a plate and frame filter press. Other forms of the membrane may also be employed such as hollow tubes and fibers through which or around which a feed is supplied or circulated with the product being removed at the other side of the tube as a vapor. Various other shapes or sizes are readily adaptable to commercial installations. The membrane, of course, must be insoluble in the organic medium to be separated. "Membrane insolubility" as used herein is taken to include that the membrane material is not substantially solution-swellable or sufficiently weakened by its presence in the solution to impart "rubbery" characteristics which can cause creep and rupture under the conditions of use including high pressures.

The art of membrane usage is well known with substantial literature being available on membrane support, fluid flow and the like. The present invention is practiced with such conventional procedures and apparatus. The membrane, of course, must be sufficiently thin to permit permeation as desired, but sufficiently thick so as to not rupture under pressure conditions employed. Typically suitable membranes have a thickness of ½ to about 10 mils.

The membrane may be prepared by any suitable procedure such as for example by casting a film or spinning hollow fiber from a "dope" containing polymer and solvent. Such preparations are well known to the art.

The following example illustrates specific embodiments of the present invention. In the example membranes employed are in the form of film disk and were mounted in a membrane holder. Unless otherwise indicated, all membranes were 1 mil in thickness.

EXAMPLE

Membrane permeations were conducted for the purpose of separating styrene from an organic liquid consisting of 70 wt. percent styrene and 30 wt. percent ethylbenzene using polyamide membranes having units selected from the groups consisting of

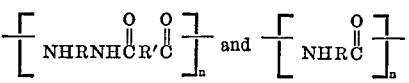

wherein R and R' are defined as above and wherein $n$ indicates the degree of polymerization. The separations were carried out under pervaporation permeation conditions. In each run preferential permeation of styrene was effected. In each run the pressure on the liquid side was atmospheric and the pressure on the vapor side was 0.1 mm. Hg. The results are shown in the table.

TABLE

| Run number | Polyamide membrane | Temp. of run, °C. | Separation factor | Rate×10⁴, grams/hour/ 11.3 cm./mil of membrane thickness |
|---|---|---|---|---|
| 1 | Nylon 6 [1] | 22 | ~1 | <0.01 |
| 2 | Nylon 6, 6 [1] | 22 | 2.75 | 2 |
| 3 | Nylon 6, 9 [1] | 55 | 2.4 | 6 |
| 4 | Nylon 6, 10 [1] | 22 | ~4 | <0.01 |
| 5 | ...do... | 55 | 1.6 | 21 |
| 6 | Nylon 11 [2] | 22 | [3] 1.2–7.2 | 1 |
| 7 | ...do... | 55 | [3] 1.1–2.0 | 35–200 |
| 8 | Nylon 12 [2] | 22 | [3] 2–15 | 5–20 |
| 9 | ...do... | 55 | [3] 1.6–1.9 | 60–300 |
| 10 | Substituted hexamethylene diamine [1] plus adipic acid.[4] | 22 | | [5] ~0 |
| 11 | 1,4-bis(aminomethyl)cyclohexane [1] plus dodecanoic acid. | 22 | | [6] .001 |
| 12 | 35/65 copolymer of hexamethylene terephthalamide [1] and hexamethylene adipamide. | 22 | 2.7 | 1.1 |

[1] Membrane cast from solution.
[2] Membrane melt pressed.
[3] Indicates multiple runs.
[4] Sold by Hoechst Chemical (Germany) under name Trogamid-T.
[5] Membrane judged too thick for convenient measurement —2.7 mils.
[6] Membrane judged too thick for convenient measurement —2.5 mils.

While the invention has been described with reference to particular embodiments thereof, it will be appreciated that modifications and variations are possible without departing from the invention.

What is claimed is:

1. A process for the separation of styrene from an organic feed mixture comprising styrene and ethylbenzene which comprises contacting the said mixture against one side of a polyamide membrane, said membrane having units selected from a group consisting of

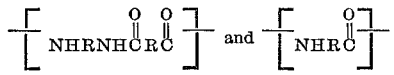

wherein R and R' are selected from the group consisting of aliphatic and aromatic and withdrawing at the second side of the membrane a vaporous mixture having a higher concentration of styrene than the aforesaid feed mixture with the mixture at the second side maintained at a lower chemical potential than at the feed side.

2. The process of claim 1 wherein the pressure on the second side of the membrane is less than atmospheric pressure and lower than the pressure on the other side of the membrane.

3. The process of claim 1 wherein the feed mixture is a liquid mixture.

4. The process of claim 1 wherein the membrane is nylon 6,6.

5. The process of claim 1 wherein the membrane is nylon 6,9.

6. The process of claim 1 wherein the membrane is nylon 6,10.

7. The process of claim 1 wherein the membrane is nylon 6,11.

8. The process of claim 1 wherein the membrane is nylon 6.

9. The process of claim 1 wherein the membrane is nylon 11.

10. The process of claim 1 wherein the membrane is nylon 12.

References Cited

UNITED STATES PATENTS

| 2,970,106 | 1/1961 | Binning et al. | 260—674 R |
| 3,228,876 | 1/1966 | Mahon | 260—674 R |
| 3,726,934 | 4/1973 | Strazik et al. | 260—669 A |

CURTIS R. DAVIS, Primary Examiner

U.S. Cl. X.R.

260—674 R